April 22, 1952 C. F. BALL 2,593,521
FLUID OPERATED CLUTCH
Filed Sept. 28, 1948

Inventor:
Charles F. Ball
by John F. Schmidt
Attorney

Patented Apr. 22, 1952

2,593,521

UNITED STATES PATENT OFFICE 2,593,521

FLUID OPERATED CLUTCH

Charles F. Ball, Franklin, Pa., assignor to Joy Manufacturing Company, Pittsburgh, Pa., a corporation of Pennsylvania Application September 28, 1948, Serial No. 51,587

6 Claims. (Cl. 192—85)

This invention relates to a clutch, especially to a clutch with a predetermined maximum pressure applied to engagement thereof, in order that the torque applied to a driven member may be limited to a predetermined maximum.

There are numerous applications in which it is desirable to have a clutch of the torque limiting type. One such application is in mining machinery where one power source may serve the purpose of driving several different machines having different power requirements, and the available power may in some cases be much greater than is required to perform a particular function. In such cases, an application of excessive power might result in failure of the machine and corresponding failure of the function performed or purpose served by the machine.

It is accordingly an object of this invention to provide a friction clutch of the torque limiting type in which a simple mechanism is provided which will insure that not more than a predetermined maximum amount of torque is transmitted. It is another object to provide a clutch which can be economically manufactured and in which the torque limiting features allow for adjustment of the maximum amount of torque which can be transmitted. These and other objects are accomplished in a torque limiting friction clutch in which the clutch engaging member travels through a fixed distance at the end of which it strikes a shoulder which limits its travel in the direction of clutch engagement. Clutch plates are disposed between the clutch engaging member and a yieldable back-up member, the back-up member having means including a threaded sleeve connection for adjusting the pressure of the back-up member against the clutch plates.

Figure 1:
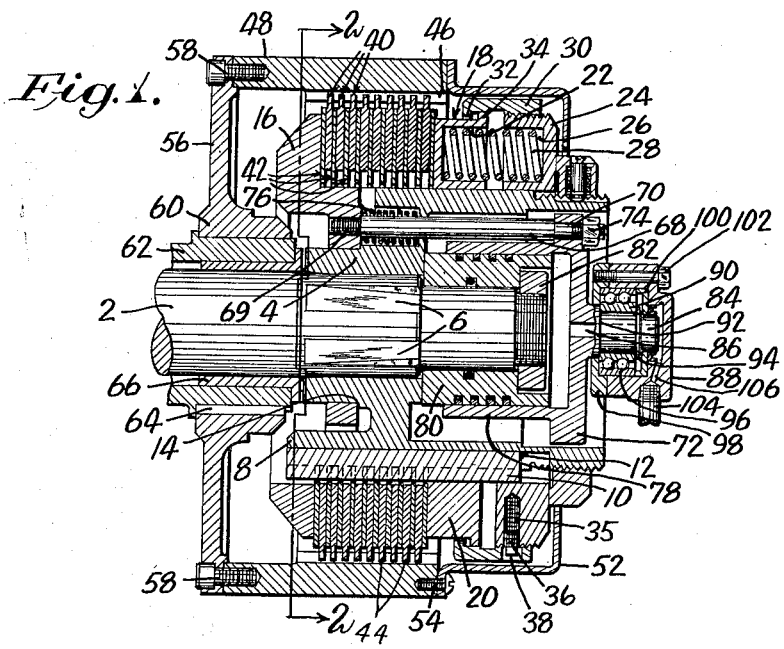
Fig. 1 is a longitudinal sectional view through a clutch embodying the invention.
Figure 2:
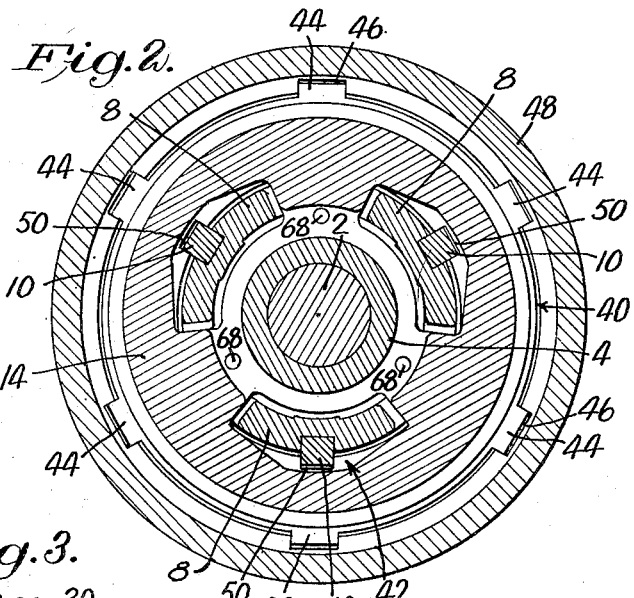
Fig. 2 is a view in section substantially on the planes of line 2—2 of Fig. 1.

In the embodiment of the invention shown in the drawing, power from any suitable power source, not shown, is supplied to the clutch by way of a shaft 2. A hub 4 is mounted on shaft 2 and is driven thereby by means of keys which cooperate with one or more keyways, such as those shown at 6.

Hub 4 has three axially extending projections 8 which are axially slotted or recessed to receive keys 10 which may, if desired, be welded to the hub as shown at 12.

The hub constitutes a rotatable element having a circumferential shoulder 14. A plate engaging member 16 is slidable on the rotatable element 4 in the direction of clutch engagement and is limited in its movement in that direction by engagement with the shoulder 14. A yieldable back-up member 18 is provided, in order that the clutch plates or discs disposed between the plate engaging member 16 and the back-up member may have a predetermined pressure applied for their engagement.

The yieldable back-up member comprises: a back-up plate 20 having a plurality of recesses, one of which is shown at 22; a spring holder 24 having a similar number of recesses, one of which is shown at 26, the recesses 22 and 26 being opposed and being arranged in axial alinement; a plurality of springs, one spring 28 in each pair of opposed recesses 22 and 26; and a threaded connection 30 which has an inward extending flange 32 cooperating with an outward extending flange 34 on plate 20 to provide a lost motion connection therewith, and which has a threaded connection with the spring holder 24. Spring holder 24 is provided with at least one recess 35 which is threaded to receive a screw 36. The screw 36 cooperates with one of a plurality of openings 38 in the threaded member 30 to permit holding the member 30 in a selected one of a plurality of different positions. This feature permits setting the clutch with a predetermined load on the springs 28.

Between the yieldable back-up member indicated generally at 18 and the plate engaging member 16, there are disposed alternate clutch discs or plates 40 and 42. Plates 40 are provided with outward-extending projections 44 which cooperate with axially extending grooves or recesses 46 in a housing 48, in order that plates 40 may be non-rotatable with regard to the housing. The intermediate alternate plates 42 are non-rotatable with regard to the hub 4 because of the aforesaid keys 10 which cooperate with recesses 50 in the plates 42.

A cup-shaped end cap 52 is secured to one end of housing 48 by means of screws 54, and an end plate 56 is secured to the opposite end of housing 48 by means of screws 58. End plate 56 is provided with a hub 60 which is keyed to a sleeve 62 by means of a key 64. Sleeve 62 constitutes the output shaft and is rotatable on the input shaft 2 by means of the bushing or sleeve bearing 66.

Rotatable element 4 is provided with a plurality of openings to accommodate a similar number of clutch operating rods 68. The rods 68 are screwed at 69 into plate engaging member 16 and are provided at their other end with a reduced diameter portion 70 which engages a flange 72. The flange 72 is clamped in place on rods 68 by means of nuts one of which is shown at 74. A spring 76 is preferably provided with each clutch actuating rod 68 and is compressed between hub 4 and plate engaging member 16.

The aforesaid flange 72 is integral with a hydraulic cylinder 78 of which the piston 80 is secured to the end of shaft 2 by means of a nut 82. At its outer end the hydraulic cylinder 78 is provided with an integral connection 84 having a fluid passage 86 therethrough. A hydraulic chamber 88 is mounted on the connection 84 in such a manner that connection 84 may rotate relative to the chamber 88. To this end, the inner race 90 of a ball bearing is clamped between a shoulder 92 and a snap ring 94 while the outer race 96 is clamped between a plate 98 and a flanged washer 100 by means of threaded members 102 extending through the chamber 88 into the plate 98. Flanged washer 100 serves to supported a suitable oil seal to minimize the amount of hydraulic fluid which may leak past the bearing. A hydraulic fluid conduit 104 has a threaded connection with the fluid chamber 88 and supplies hydraulic fluid to the inside of the chamber by way of a passage 106 in the chamber wall.

Operation

Figure 3:
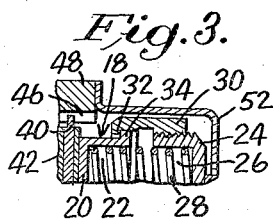
Fig. 3 is a detail view of a portion of Fig. 1 showing the yieldable back-up member in a different operating position from that which is shown in Fig. 1.

The clutch is shown engaged in Fig. 1. In Fig. 3 the back-up member is shown with the slack or lost motion being taken up between flange 34 of plate 20 and flange 32 of sleeve 30. In order for the clutch parts to move from the position shown in Fig. 1 to the position shown in Fig. 3, the plate engaging member 16 must move to the left away from shoulder 14; it does this under the action of springs 28 and 76. By the time the parts have taken the position shown in Fig. 3, the springs 28 have been extended or expanded as far as they can go, because of the two flanges 32 and 34 coming into engagement. Further leftward movement of plate engaging member 16 has to be accomplished by further extension of springs 76.

With the clutch disengaged, if it is desired to engage the clutch, hydraulic fluid is admitted to the interior of cylinder 78 by way of conduit 104, passage 106 in the wall of chamber 88 and passage 86 through the connection 84. The fluid pressure moves the cylinder 78 to the right as seen in Fig. 1. Flanges 72 thereupon move the actuating rods 68 to the right as seen in Fig. 1, causing the plate engaging member 16 to move to the right and squeezing the clutch plates 40 and 42 together.

The first portion of the rightward travel of plate engaging member 16 takes up the slack between the clutch plates and partially compresses springs 76. Further movement to the right of the plate engaging member 16 will necessitate compressing the springs 28 in addition to further compressing springs 76. Plate engaging member 16 can move to the right only until it comes up against shoulder 14 on the rotatable element 4. The amount of pressure that is being applied to the engagement of the clutch plates is determined by the pressure exerted by springs 28, and this pressure is determined by the amount of initial compression put on the springs by means of the threaded sleeve 30, and by the amount by which the flange 34 is separated from flange 32. This separation leaves a space between the two flanges which is clearly seen in Fig. 1.

With the clutch thus engaged, power is transmitted from input shaft 2 through rotatable element 4, keys 10, clutch plates 42, clutch plates 40, housing 48, housing plate 56 and output shaft or sleeve 62.

With a clutch made according to this invention, a predetermined amount of compression may be applied to the springs 28. This compression is easily varied or adjusted by removing the end cap 52 after which screw 36 may be turned inward far enough to permit rotation of sleeve 30 in the desired direction. The periphery of sleeve 30 may be provided with suitable indicia which may be calibrated in terms of clutch pressure, torque, or in any other desired manner. When the sleeve 30 has been set to provide the desired pressure, screw 36 may be screwed outward in its tapped hole 35 to hold the sleeve in its adjusted position. The clutch plates cannot thereafter be submitted to an indefinite and unlimited pressure. The maximum pressure on the plates is reached when the shoulder 14 comes into engagement with the plate engaging member as described above.

Thus the invention provides a clutch in which the plate engaging member moves through a fixed distance in engaging the clutch and in which the plates are compressed together under a predetermined maximum pressure, and the clutch will transmit only a maximum torque according to the maximum clutch pressure. Other advantages will be apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In a fluid operated clutch, a housing, a rotatable element, a shoulder on the element, a plate engaging member movable on the element and limited in its movement by the shoulder, a yieldable back-up member, clutch plates between the plate engaging member and the back-up member, alternate plates being non-rotatable relative to the housing and the intermediate alternate plates being non-rotatable relative to the rotatable element, and spring-opposed fluid operated means connected to effect relative movement of the plate engaging member and the back-up member to engage and disengage the clutch within the limits imposed by the aforesaid shoulder on the rotatable element.

2. The clutch of claim 1, in which the yieldable back-up member comprises a plate provided with a plurality of recesses, a spring holder having recesses opposed to the recesses of said plate, a spring in each pair of opposed recesses, and a sleeve having a lost motion connection with one of said recessed parts and a threaded connection with the other.

3. In a hydraulic clutch, a housing, a rotatable element, a shoulder on the element, a plate engaging member movable on the element and limited in its movement by the shoulder, a yieldable back-up member, clutch plates between the plate engaging member and the back-up member, alternate plates being non-rotatable relative to the housing and the intermediate alternate plates being non-rotatable relative to the rotatable element, and a spring-opposed hydraulic piston and cylinder connected to effect relative movement of the plate engaging member and the back-up member to engage and disengage the clutch within the limits imposed by the aforesaid shoulder on the rotatable element.

4. The clutch of claim 3, in which the yieldable back-up member comprises a plate provided with a plurality of recesses, a spring holder having recesses opposed to the recesses of said plate, a spring in each pair of opposed recesses, and a sleeve having a lost motion connection with one of said recessed parts and a threaded connection with the other.

5. The clutch of claim 4, and powered means connected to drive the rotatable element, the powered means including a shaft, the piston being secured to the end of the shaft, and the cylinder being movable on the piston and being connected to the plate engaging member.

6. The clutch of claim 3, and powered means connected to drive the rotatable element, the powered means including a shaft, the piston being secured to the end of the shaft, and the cylinder being movable on the piston and being connected to the plate engaging member.

CHARLES F. BALL.

REFERENCES CITED

The following references are of record in the file of this patent:

UNITED STATES PATENTS

| Number | Name | Date |
|---|---|---|
| 865,450 | Sturtevant | Sept. 10, 1907 |
| 1,442,092 | Parsons et al. | Jan. 16, 1923 |
| 1,632,526 | Willgoos | June 14, 1927 |
| 2,046,453 | Havill et al. | July 7, 1936 |
| 2,089,733 | Criley | Aug. 10, 1937 |
| 2,120,798 | Criley | June 14, 1938 |
| 2,282,143 | Carter | May 5, 1942 |
| 2,386,220 | Lawler et al. | Oct. 9, 1945 |

FOREIGN PATENTS

| Number | Country | Date |
|---|---|---|
| 12,836 | Great Britain | May 31, 1912 |
| 583,658 | Germany | Aug. 24, 1933 |